US012722641B2

(12) United States Patent
Chen et al.

(10) Patent No.: US 12,722,641 B2
(45) Date of Patent: Sep. 1, 2026

(54) FRONT-VEHICLE PATH-FOLLOWING SYSTEM AND METHOD THEREOF

(71) Applicant: Automotive Research & Testing Center, Changhua County (TW)

(72) Inventors: Bo-Yu Chen, Changhua County (TW); Tsung-Ming Hsu, Changhua County (TW); Ming-Kuan Ko, Changhua County (TW)

(73) Assignee: AUTOMOTIVE RESEARCH & TESTING CENTER, Changhua County (TW)

(*) Notice: Subject to any disclaimer, the term of this patent is extended or adjusted under 35 U.S.C. 154(b) by 45 days.

(21) Appl. No.: 18/965,624

(22) Filed: Dec. 2, 2024

(65) Prior Publication Data

US 2026/0152186 A1 Jun. 4, 2026

(51) Int. Cl.
*B60W 40/04* (2006.01)
*B60W 30/165* (2020.01)

(52) U.S. Cl.
CPC .......... *B60W 40/04* (2013.01); *B60W 30/165* (2013.01); *B60W 2420/408* (2024.01); *B60W 2554/4041* (2020.02); *B60W 2554/4042* (2020.02); *B60W 2556/10* (2020.02); *B60W 2720/28* (2013.01)

(58) Field of Classification Search
CPC ............... B60W 40/04; B60W 30/165; B60W 2554/4041; B60W 2556/10; B60W 2554/4042; B60W 2420/408; B60W 2720/28
See application file for complete search history.

(56) References Cited

U.S. PATENT DOCUMENTS

2016/0297438 A1* 10/2016 Han .................... B60W 30/165
2023/0174105 A1* 6/2023 Zhou ................. B60W 60/0013 701/23
2023/0195105 A1* 6/2023 Lei ...................... G05D 1/0022 701/2

* cited by examiner

*Primary Examiner* — Naeem Taslim Alam
(74) *Attorney, Agent, or Firm* — Birch, Stewart, Kolasch & Birch, LLP

(57) ABSTRACT

A front-vehicle path-following system and a method thereof are applied to a host vehicle. The host vehicle receives front-vehicle information and detects the host-vehicle information of a front vehicle. The system generates two paths, one is a front-vehicle estimation path generated based on the host-vehicle information, and the other is a front-vehicle wheel speed path generated based on the front-vehicle information. The location of the host vehicle currently located on the front-vehicle wheel speed path is matched as a path following start point. A following path decision is made based on the states of the two paths. Finally, control the host vehicle to follow one of the two paths based on the tracking path decision. The present invention can follow the path of the front vehicle to achieve steering and following purposes when failing to detect lane lines.

20 Claims, 6 Drawing Sheets

FRONT-VEHICLE PATH-FOLLOWING SYSTEM AND METHOD THEREOF

BACKGROUND OF THE INVENTION

Field of the Invention

The present invention relates to technology in an autonomous driving field, particularly to a front-vehicle path-following system and a method thereof.

Description of the Related Art

Autonomous driving technology gradually becomes mature, and self-driving platooning technology has been developed, which consists of multiple autonomous vehicles forming a fleet and operating in a coordinated manner. The fleet uses advanced sensing technology, inter-vehicle communication systems and autonomous decision-making control algorithms, uses vehicle-to-vehicle real-time transmission technology to exchange body dynamic information between vehicles to achieve simultaneous control and movement functions, and implements collaborative operation among fleet members. Internationally, this technology is generally applied to relatively simple scenarios such as highways. For the development of urban platoons, the development goal is to use the advanced driving assistance system to detect lane lines for lane keeping and platoon control based on the platooning of the team leader driving the leading vehicle followed by other vehicles driven by no driver. The maximum speed of the platoon can reach 80 kph. However, this technology can only operate in areas where lane lines exist. Self-driving must be interrupted when driving at intersections, entering stations, or stopping at stops.

For the lateral control of vehicles, existing technologies use lane line recognition, real-time kinematic (RTK) positioning, simultaneous localization and mapping (SLAM), and other methods to obtain the target path, thereby steering the vehicle to track the front vehicle of the fleet. However, lane line recognition cannot be applied to areas where lane line detection fails, such as intersections, arrival, and stops, etc. RTK and SLAM positioning are limited by the need to collect site maps in advance and high equipment costs. Therefore, it is difficult to promote RTK and SLAM positioning.

Accordingly, the present invention provides a front-vehicle path-following system and a method thereof in order to overcome the deficiencies of the foregoing conventional technologies and meet future needs. The specific architecture and its embodiments will be described as follows in detail:

SUMMARY OF THE INVENTION

The primary objective of the present invention is to provide a front-vehicle path-following system and a method thereof, which receive front-vehicle information transmitted by a front vehicle, combines the front-vehicle information with host-vehicle information obtained by the host vehicle detecting the front vehicle, respectively generate a front-vehicle wheel speed path and a front-vehicle estimation path, and diagnose which one of the front-vehicle path is more suitable for the host vehicle to follow, thereby using the manner of tracking the front vehicle to solve the problem with being unable to drive automatically in areas where lane line detection fails.

Another objective of the present invention is to provide a front-vehicle path-following system and a method thereof, wherein the host vehicle obtains the front-vehicle information based on vehicle-to-vehicle wireless communication and generates the front-vehicle wheel speed path based on the information of the front-vehicle wheel speed sensor in the front-vehicle information.

Further objective of the present invention is to provide a front-vehicle path-following system and a method thereof, wherein the host vehicle can generate a front-vehicle estimation path based on front road images captured by an image-capturing device and the coordinates of the host vehicle obtained by a wheel speed sensor, combine the front-vehicle estimation path with the front-vehicle wheel speed path, and diagnose which one of the paths has path points distributed evenly and densely to increase the success rate of tracking the front vehicle.

In order to achieve the foregoing objectives, the present invention provides a front-vehicle path-following system applied to a host vehicle. The front-vehicle path-following system includes a transceiver interface and at least one processor. The transceiver interface is coupled to sensing devices on the host vehicle and configured to receive multiple types of host-vehicle information detected by the sensing devices and multiple types of front-vehicle information received by the sensing devices. The multiple types of front-vehicle information are transmitted by a front vehicle. The processor is coupled to the controller of the host vehicle and the transceiver interface and configured to: perform a front-vehicle path-estimating step to generate a front-vehicle estimation path based on the multiple types of host-vehicle information; perform a path-matching step to generate a front-vehicle wheel speed path based on the multiple types of front-vehicle information and determine whether the current coordinate system of the host vehicle overlaps an adjacent coordinate system on the front-vehicle estimation path, wherein when the current coordinate system overlaps the adjacent coordinate system, the location of the host vehicle currently located on the front-vehicle wheel speed path is matched as a path following start point and a following path decision is made based on the path following start point and the states of the front-vehicle wheel speed path and the front-vehicle estimation path; and perform a path switching step to control the controller to switch the following path of the host vehicle based on the following path decision, such that the host vehicle follows the front-vehicle wheel speed path or the front-vehicle estimation path.

In an embodiment of the present invention, the front-vehicle path-estimating step includes: using the historical locations of the front vehicle in the multiple types of front-vehicle information as path points and performing coordinate transformation on the path points to transform the past coordinate system of the host vehicle into the current coordinate system of the host vehicle; and fitting the path points into a path as the front-vehicle estimation path.

In an embodiment of the present invention, the path-matching step is performed to calculate a path fitting equation based on the coordinates of the path points and determine whether location errors and direction errors exist between the current coordinate system of the host vehicle and the adjacent coordinate system on the front-vehicle estimation path to determine whether the current coordinate system of the host vehicle overlaps the adjacent coordinate system.

In an embodiment of the present invention, the step of matching the location of the host vehicle currently located on the front-vehicle wheel speed path as the path following start point and making the following path decision based on the states of the front-vehicle wheel speed path and the front-vehicle estimation path includes: comparing the detected relative location of the front vehicle to the host vehicle to the detected current location of the front vehicle to determine the location of the host vehicle currently located on the front-vehicle wheel speed path as the path following start point, wherein the current location is included in the multiple types of host-vehicle information; and generating path following points based on the relative location and the direction variations of the host vehicle and the front vehicle and fitting the path following points generated after determining the path following start point to make the following path decision.

In an embodiment of the present invention, the path-matching step is performed to preset the front-vehicle wheel speed path and the front-vehicle estimation path to be identical.

In an embodiment of the present invention, the path-matching step includes: diagnosing the states of path points on the front-vehicle wheel speed path to determine whether the front-vehicle wheel speed path meets following conditions: if yes, making a following front-vehicle wheel speed path decision; and if no, diagnosing states of path points on the front-vehicle estimation path to determine whether the front-vehicle estimation path meets the following conditions: if yes, making a following front-vehicle estimation path decision, wherein the path points on the front-vehicle wheel speed path and the front-vehicle estimation path are generated after determining the path following start point; and if no, ending.

In an embodiment of the present invention, the following conditions include determining whether distribution of the path points is even and dense and determining whether a preview point generated based on a pure pursuit algorithm is located on the front-vehicle wheel speed path or the front-vehicle estimation path.

In an embodiment of the present invention, the sensing devices include at least one radar, a vehicle-to-vehicle wireless communication module, a host-vehicle wheel speed sensor, and an image-capturing device. The radar is configured to detect the relative speed and the relative distance of the front vehicle to the host vehicle. The vehicle-to-vehicle wireless communication module is configured to obtain the speed, the acceleration, the location, and the heading angle of the front vehicle transmitted by the front vehicle. The processor is configured to generate the front-vehicle wheel speed path and the coordinate system of the front vehicle based on the location and the heading angle of the front vehicle. The host-vehicle wheel speed sensor is configured to detect the location and the heading angle of the host vehicle and provide them for the processor to generate the current coordinate system and the past coordinate system of the host vehicle. The image-capturing device is configured to capture front road images and provide them for the processor. The processor is configured to capture the image of the front vehicle from the front road images and calculate the relative location of the front vehicle to the host vehicle based on the image of the front vehicle.

In an embodiment of the present invention, the multiple types of front-vehicle information include the speed, the acceleration, the location, and the heading angle of the front vehicle. The speed and the acceleration of the front vehicle are data fed back by the chassis of the front vehicle. The location and the heading angle of the front vehicle are measured by the front-vehicle wheel speed sensor of the front vehicle.

The present invention also provides a front-vehicle path-following method applied to the front-vehicle path-following system of a host vehicle. The host vehicle receives multiple types of host-vehicle information detected by sensing devices and multiple types of front-vehicle information received by the sensing devices to perform the front-vehicle path-following method. The front-vehicle path-following method includes: performing a front-vehicle path-estimating step to generate a front-vehicle estimation path based on the multiple types of host-vehicle information; performing a path-matching step to generate a front-vehicle wheel speed path based on the multiple types of front-vehicle information and determine whether the current coordinate system of the host vehicle overlaps an adjacent coordinate system on the front-vehicle estimation path, wherein when the current coordinate system overlaps the adjacent coordinate system, the location of the host vehicle currently located on the front-vehicle wheel speed path is matched as a path following start point and a following path decision is made based on the path following start point and the states of the front-vehicle wheel speed path and the front-vehicle estimation path, and the multiple types of front-vehicle information are transmitted from a front vehicle to the host vehicle; and performing a path switching step to control a controller to switch the following path of the host vehicle based on the following path decision, such that the host vehicle follows the front-vehicle wheel speed path or the front-vehicle estimation path.

Below, the embodiments are described in detail in cooperation with the drawings to make easily understood the technical contents, characteristics and accomplishments of the present invention.

DETAILED DESCRIPTION OF THE INVENTION

The technical solutions in the embodiments of the present invention will be clearly and completely described below with reference to the drawings in the embodiments of the present invention. Obviously, the described embodiments are part of the embodiments of the present invention, not all of the embodiments. Based on the embodiments of the present invention, all other embodiments obtained by those skilled in the art without making inventive efforts should be included within the scope of the present invention.

It should be understood that, when used in this specification and the scope of the claims, the terms "comprising" and "including" refer to the presence of a stated feature, whole, step, operation, element, and/or component, but does not exclude the presence or addition of one or more other features, wholes, steps, operations, elements, components and/or combinations of these.

It should also be understood that the terms used in the specification of the present invention are only used to describe particular embodiments but not intended to limit the present invention. As used in this specification and the claims, the singular forms "a," "an," and "the" are intended to include the plural forms unless the context clearly dictates otherwise.

It should further be understood that the terms "and/or" used in the specification and the claims refer to any and all possible combinations of one or more of the associated listed items and include these combinations.

Figure 1:
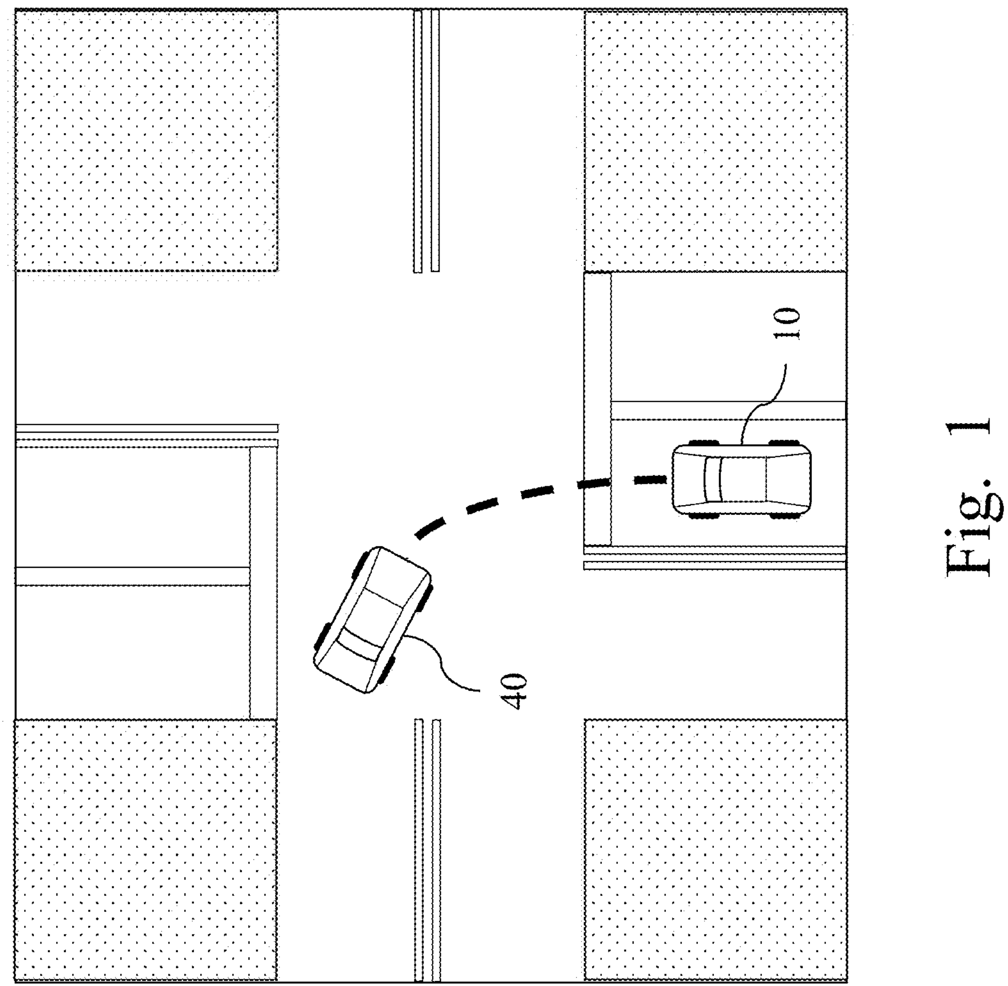
FIG. 1 is a schematic diagram illustrating a host vehicle that follows a front-vehicle path to turn left at an intersection according to an embodiment of the present invention.
Figure 2:
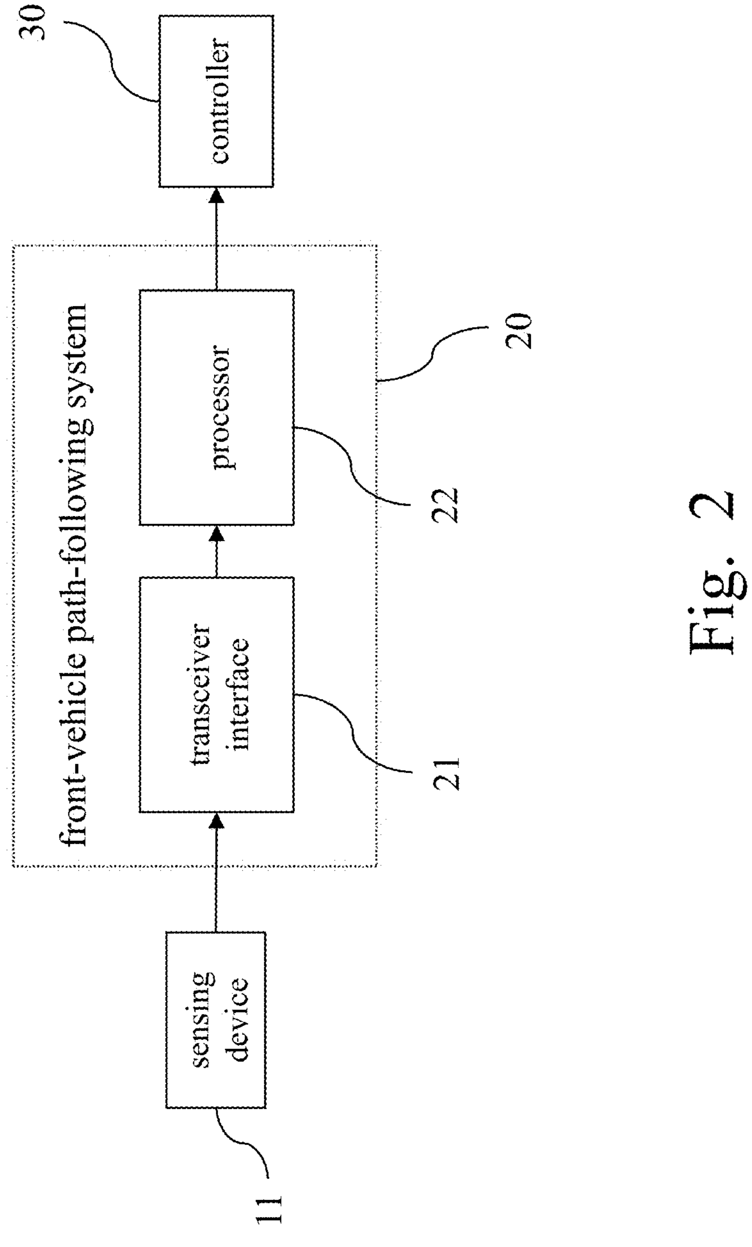
FIG. 2 is a schematic diagram illustrating a front-vehicle path-following system according to an embodiment of the present invention.

The present invention provides a front-vehicle path-following system and a method thereof, which are applied to a host vehicle in areas where lane line detection fails, such as intersections, arrival, pull-out areas, and stops. The host vehicle can follow the path of a front vehicle to drive. As illustrated in FIG. 1, a host vehicle 10 and a front vehicle 40 form a fleet. Since there are no lane lines to follow at an intersection, the host vehicle 10 follows the path of the front vehicle 40 to turn. Please refer to FIG. 2. FIG. 2 is a schematic diagram illustrating a front-vehicle path-following system according to an embodiment of the present invention.

The front-vehicle path-following system 20 of the present invention is installed in the driving computer of a host vehicle 10. The front-vehicle path-following system 20 includes a transceiver interface 21 and at least one processor 22. The host vehicle 10 is provided with a plurality of sensing devices. The transceiver interface 21, coupled to the sensing devices 11, respectively receives multiple types of host-vehicle information detected by the sensing devices 11 and multiple types of front-vehicle information received by the sensing devices 11. The processor 22 is coupled to the transceiver interface 21 and a controller 30. The processor 22 drives the front-vehicle path-following system 20 based on the host-vehicle information and the front-vehicle information to make a decision to track the front vehicle 40. The front-vehicle path-following system 20 is coupled to at least one controller 30. The controller 30 controls the host vehicle 10 to follow the front vehicle 40 based on the decision made by the front-vehicle path-following system 20.

Figure 3:
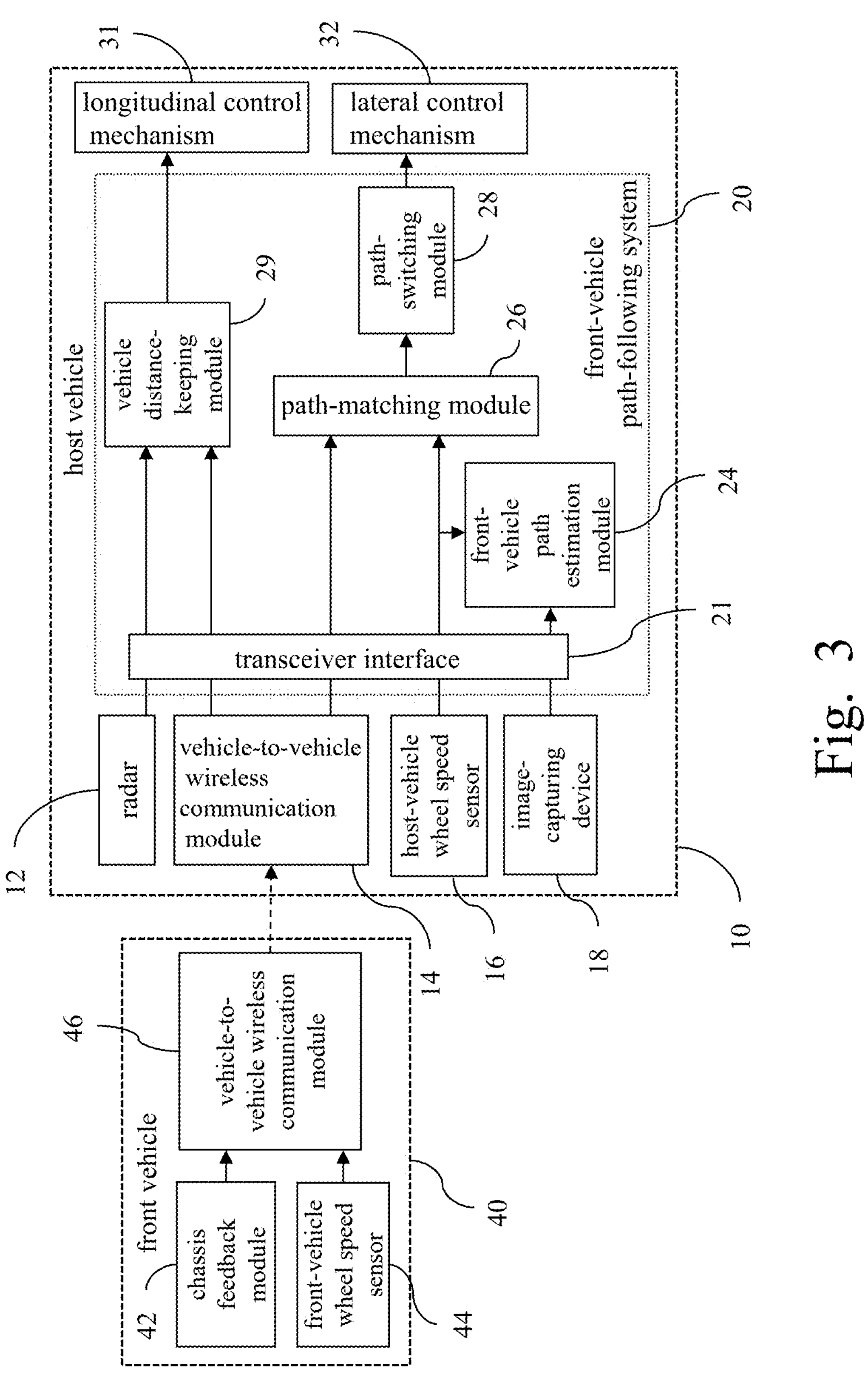
FIG. 3 is a schematic diagram illustrating a host vehicle that receives a front-vehicle signal and employs a front-vehicle path-following system to follow a front-vehicle path according to an embodiment of the present invention.

Please refer FIG. 3. FIG. 3 is a schematic diagram illustrating a host vehicle that receives a front-vehicle signal and employs a front-vehicle path-following system to follow a front-vehicle path according to an embodiment of the present invention. Refer to FIG. 2 and FIG. 3. The front vehicle 40 includes a chassis feedback module 42, a front-vehicle wheel speed sensor 44, and a vehicle-to-vehicle wireless communication module 46. The chassis feedback module 42 generates the speed and the acceleration of the front vehicle 40. The front-vehicle wheel speed sensor 44 measures the location and the heading angle of the front vehicle 40. The vehicle-to-vehicle wireless communication module 46 may be implemented with a 3G, 4G, 5G, or Wi-Fi communication device, etc. The vehicle-to-vehicle wireless communication module 46 is used for information transmission with other vehicles (such as the host vehicle 10). In the definition of the present invention, the host-vehicle information is the information detected by the host vehicle 10 itself, including the relative speed and the relative distance of the host vehicle 10 to the front vehicle 40, the location and the heading angle of the host vehicle 10, and front road images, etc. The front-vehicle information is defined as information transmitted from the front vehicle 40 to the host vehicle 10 based on wireless communication technology, including the speed, the acceleration, the location, and the heading angle of the front vehicle 40.

The controller is a device that controls the longitudinal or lateral movement of the host vehicle 10, such as an accelerator, a steering wheel, brake, etc., where each of the accelerator and the brake is a longitudinal control mechanism 31 for controlling the speed of the host vehicle 10 that moves straight forward. The steering wheel is a lateral control mechanism 32 for controlling the host vehicle 10 to turn.

The sensing devices 11 of the host vehicle 10 include at least one radar 12, a vehicle-to-vehicle wireless communication module 14, a host-vehicle wheel speed sensor 16, and an image-capturing device 18. The radar 12 is configured to detect the relative speed and the relative distance of the front vehicle 40 to the host vehicle 10. The vehicle-to-vehicle wireless communication module 14, wirelessly connected to the vehicle-to-vehicle wireless communication module 46 of the front vehicle 40, obtains the speed, the acceleration, the location, and the heading angle of the front vehicle 40 transmitted by the front vehicle 40. The front-vehicle path-following system 20 of the host vehicle 10 can generate a front-vehicle wheel speed path and the coordinate system of the front vehicle 40 based on the location and the heading angle of the front vehicle 40. The host-vehicle wheel speed sensor 16 is configured to detect the location and the heading angle of the host vehicle 10 and provide them for the front-vehicle path-following system 20. The front-vehicle path-following system 20 generates the current coordinate system and the past coordinate system of the host vehicle 10 based on the location and the heading angle of the host vehicle 10. The image-capturing device 18 captures front road images and provide them for the processor 22. The processor 22 captures the image of the front vehicle 40 from the front road images and calculates the relative location of the front vehicle 40 to the host vehicle 10 based on the image of the front vehicle 40.

The processor 22 includes a vehicle distance-keeping module 29, a front-vehicle path estimation module 24, a path-matching module 26, and a path-switching module 28. These modules can be arranged in the same processor or arranged in different processors. The processor 22 is configured to perform the steps performed by these modules. The front-vehicle path estimation module 24 performs a front-vehicle path estimation step and then the path-matching module 26 performs a path-matching step to make a following path decision. Finally, the path-switching module 28 performs the path-switching step based on the following path decision.

Figure 4:
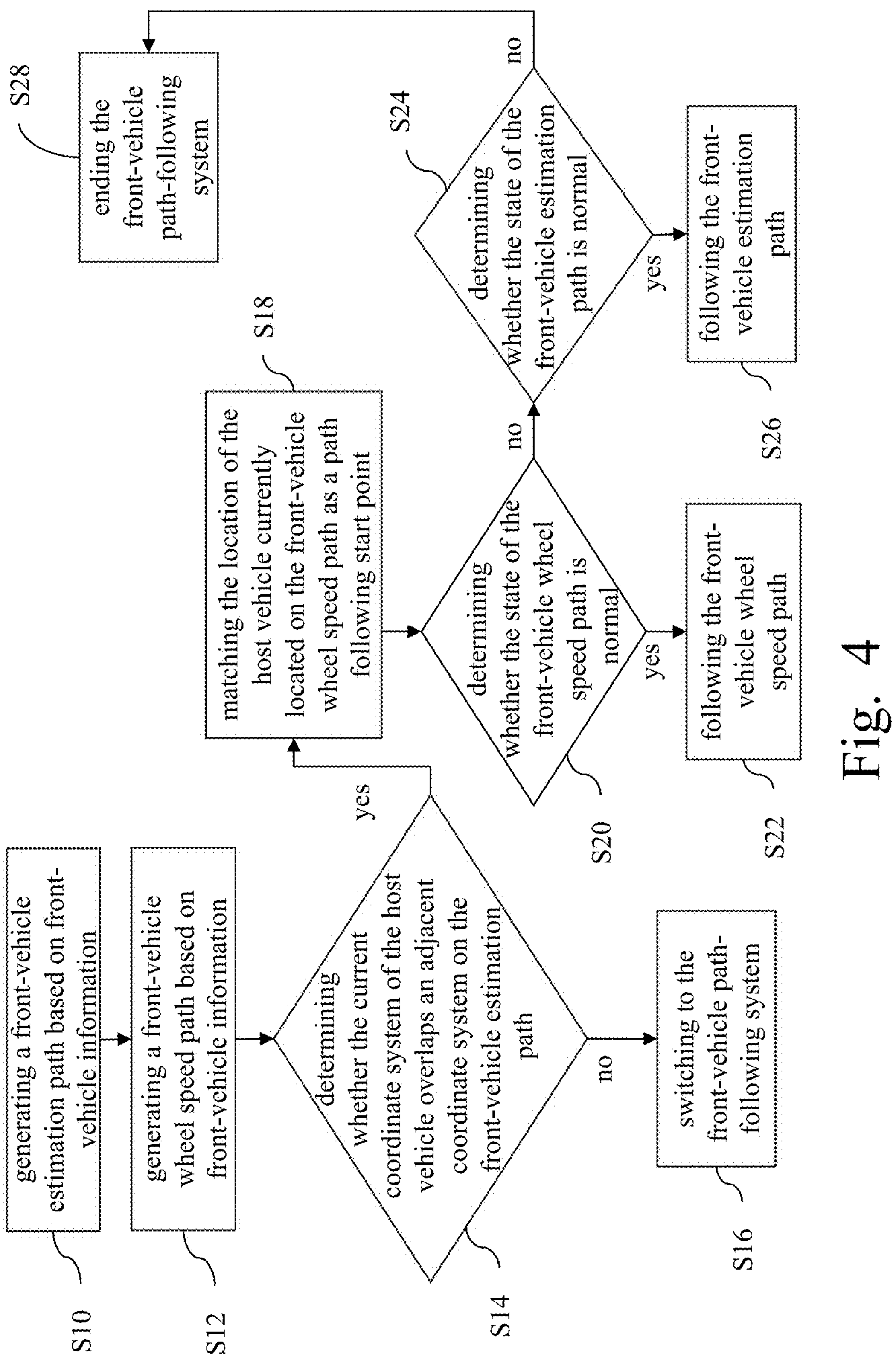
FIG. 4 is a flowchart of a front-vehicle path-following method according to an embodiment of the present invention.

The steps performed by the modules are described as follows. Please refer to FIG. 3 and FIG. 4. FIG. 4 is a flowchart of a front-vehicle path-following method according to an embodiment of the present invention.

Front-vehicle path estimation step: As shown in Step S10, the front-vehicle path estimation module 24 generates a front-vehicle estimation path based on the host-vehicle information. Furthermore, the host vehicle 10 is located at the origin of the coordinate system. Thus, when the host vehicle 10 moves, the location of the coordinate system will also change accordingly. Therefore, the front-vehicle path estimation module 24 will use the historical locations of the front vehicle 40 as path points and perform coordinate transformation on these path points to transform the past coordinate system of the host vehicle 10 into the current coordinate system of the host vehicle 10. Then, these path points are fitted into a path as the front-vehicle estimation path $P_2=T \cdot P_1$, where $P_1=[x_1\ y_1\ 0\ 1]'$ represents the path points of the front vehicle 40 based on the past coordinate system of the host vehicle 10, $P_2=[x_2\ y_2\ 0\ 1]'$ represents the path points of the front vehicle 40 based on the current coordinate system of the host vehicle 10, T is a transformation matrix, and $$T=\begin{bmatrix} \cos\theta & -\sin\theta & 0 & d_x \\ \sin\theta & \cos\theta & 0 & d_y \\ 0 & 0 & 1 & 0 \\ 0 & 0 & 0 & 1 \end{bmatrix}.$$

Path-matching step: A front-vehicle wheel speed path is generated based on the multiple types of front-vehicle information and it is determined whether the current coordinate system of the host vehicle overlaps an adjacent coordinate system on the front-vehicle estimation path. When the current coordinate system overlaps the adjacent coordinate system, the location of the host vehicle currently located on the front-vehicle wheel speed path is matched as a path following start point and a following path decision is made based on the states of the front-vehicle wheel speed path and the front-vehicle estimation path.

Furthermore, the flowchart of the path-matching step is described as follows. Firstly, in Step S12, the path-matching module 26 generates a front-vehicle wheel speed path based on the front-vehicle information. Then, in Step S14, the path-matching module 26 determines whether the current coordinate system of the host vehicle 10 overlaps the adjacent coordinate system on the front-vehicle estimation path. If the result is no, Step S16 is performed. In Step S16, the process is switched to the front-vehicle path-following system. After the front-vehicle path-following system employs the image-capturing device to obtain the image of the front vehicle 40 and calculates the relative location of the front vehicle 40 to the host vehicle 10, the front-vehicle path-following system calculates a steering-wheel angle command such that the host vehicle 10 tracks the front vehicle 40. If the result is yes, Step S18 is performed. In Step S18, the location of the host vehicle 10 currently located on the front-vehicle wheel speed path is matched as a path following start point.

Figure 5:
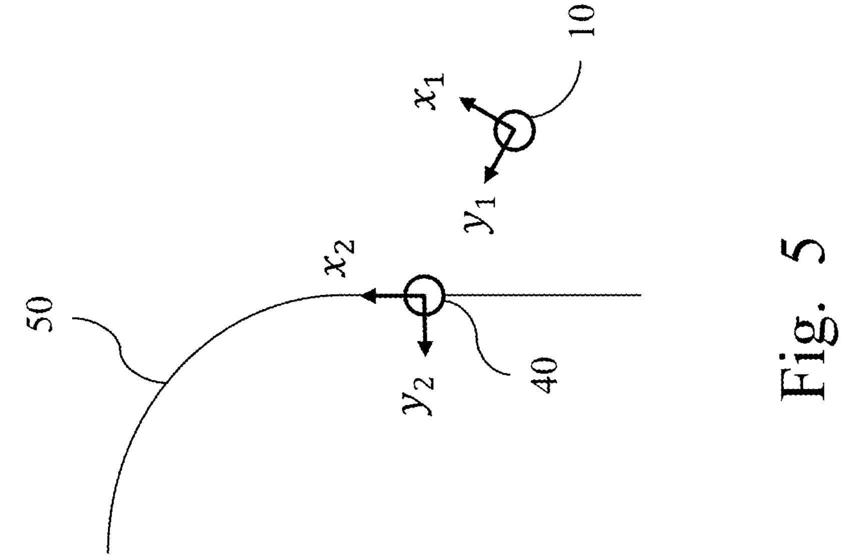
FIG. 5 is a schematic diagram of determining whether the current coordinate system of a host vehicle overlaps the adjacent coordinate system of a front vehicle according to an embodiment of the present invention.

In Step S14 of determining whether the current coordinate system of the host vehicle 10 overlaps an adjacent coordinate system on the front-vehicle estimation path, a path fitting equation $f(x)=c_3 \cdot x^3+c_2 \cdot x^2+c_1 \cdot x+c_0$ is calculated based on the coordinates of the path points of the front vehicle 40 and it is determined whether location errors and direction errors exist between the current coordinate system $(x_1, y_1)$ of the host vehicle and the adjacent coordinate system $(x_2, y_2)$ on the front-vehicle estimation path to determine whether the current coordinate system of the host vehicle overlaps the adjacent coordinate system. As illustrated in FIG. 5, the adjacent coordinate system $(x_2, y_2)$ of the front vehicle 40 is located on the front-vehicle estimation path 50. The adjacent coordinate system is calculated based on the image captured by the image-capturing device 18. When the current coordinate system $(x_1, y_1)$ of the host vehicle 10 overlaps the adjacent coordinate system $(x_2, y_2)$ of the front vehicle 40, the location errors $c_0$ and the direction errors a cos $$\left(\frac{\vec{x_1} \cdot \vec{x_2}}{\|\vec{x_1}\| \|\vec{x_2}\|}\right)$$

are less than a threshold set according to requirements. When the threshold is closer to 0, the coordinate system of the front vehicle is closer to that of the host vehicle, but the coordinate system of the front vehicle difficultly overlaps the coordinate system of the host vehicle. In a preferred embodiment, the threshold is set as the location error<10 cm and the direction error<1°.

Figure 6:
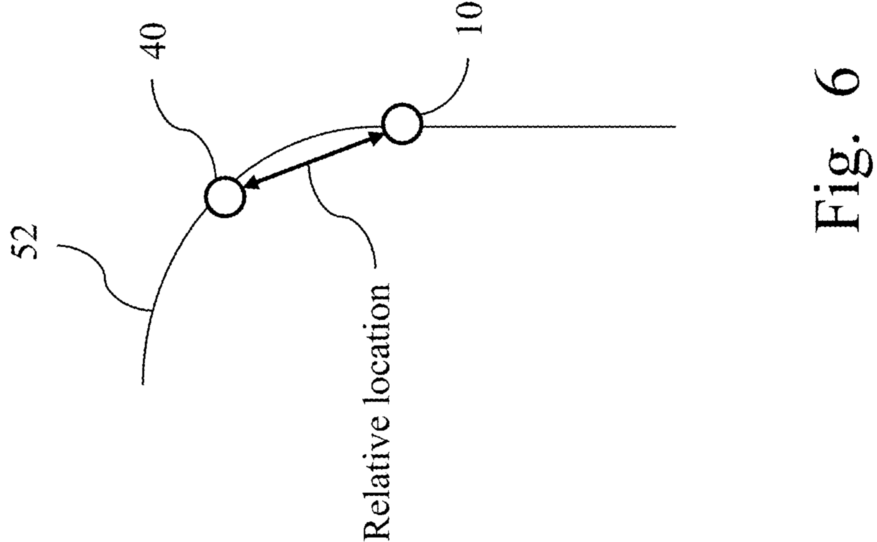
FIG. 6 is a schematic diagram of finding the path following start point of a host vehicle on a front-vehicle wheel speed path according to an embodiment of the present invention.

In Step S18, the path-matching module 26 finds the path following start point. Please refer to FIG. 6. The path-matching module 26 compares the detected relative location of the front vehicle 40 to the host vehicle 10 to the detected current location of the front vehicle 40 to determine the location of the host vehicle 10 currently located on the front-vehicle wheel speed path 52 as the path following start point. The detected relative location of the front vehicle 40 to the host vehicle 10 is obtained by the image-capturing device 18 of the host vehicle 10. In the path-matching step, the front-vehicle wheel speed path 52 and the front-vehicle estimation path 50 are preset to overlap with each other. That is to say, the front-vehicle wheel speed path 52 and the front-vehicle estimation path 50 are preset to be identical.

In Steps S20 and S24, the path-matching module 26 respectively diagnoses the states of the front-vehicle wheel speed path and the front-vehicle estimation path to make a following path decision. In the step of making the following path decision, the path-matching module 26 generates path following points based on the relative location and the direction variations of the host vehicle 10 and the front vehicle 40 after determining the path following start point. The path following points included in the front-vehicle wheel speed path and the front-vehicle estimation path. Then, the path-matching module 26 fits the path following points generated after determining the path following start point and diagnoses whether the states of the front-vehicle wheel speed path and the front-vehicle estimation path are normal. That is to say, it is determined that the states of the front-vehicle wheel speed path and the front-vehicle estimation path meet following conditions to make the following path decision that includes a following front-vehicle wheel speed path decision and a following front-vehicle estimation path decision. In the embodiment, the following conditions include determining whether distribution of the path points is even and dense and determining whether a preview point generated based on a pure pursuit algorithm is located on the front-vehicle wheel speed path or the front-vehicle estimation path. If the path points are not even enough or dense enough, a sufficiently accurate front-vehicle path cannot be generated. When the preview point is not located on the front-vehicle wheel speed path or the front-vehicle estimation path, the preview point is located on a fitted derived path that occurs after the front-vehicle wheel speed path or the front-vehicle estimation path. In such a case, the front vehicle 40 cannot be tracked correctly. Firstly, in Step S20, the path-matching module 26 diagnoses the states of path points on the front-vehicle wheel speed path to determine whether the front-vehicle wheel speed path meets the following conditions. If the result is yes, Step S22 is performed. In Step S22, a following front-vehicle wheel speed path decision is made. When the front-vehicle wheel speed path does not meet the following conditions, Step S24 is performed. In Step S24, the path-matching module 26 diagnoses the states of path points on the front-vehicle estimation path to determine whether the front-vehicle estimation path meets the following conditions. When the front-vehicle estimation path meets the following conditions, a following front-vehicle estimation path decision is made. When the front-vehicle estimation path does not meet the following conditions, Step S28 is performed. In Step S28, the decision made by the front-vehicle path-following system 20 is ended. It is noted that the path points on the front-vehicle wheel speed path 52 and the front-vehicle estimation path 50 diagnosed by the path-matching module 26 occur after the path following start point.

Path-switching step: The path-switching module 28 controls the controller 30 to switch the following path of the host vehicle based on the following path decision, so that the host vehicle follows the front-vehicle wheel speed path or the front-vehicle estimation path. If the diagnosis result of Step S20 makes the following front-vehicle wheel speed path decision, Step S22 is performed. In Step S22, the path-switching module 28 follows the front-vehicle wheel speed path based on the decision. If the diagnosis result of Step S20 does not meet the following conditions and the following front-vehicle estimation path decision is made in Step S24, Step S26 is performed. In Step S26, the path-switching module 28 follows the front-vehicle estimation path based on the decision. If the diagnosis result of Step S24 ends the front-vehicle path-following system 20 based on the decision, as shown in Step S28.

Vehicle distance-keeping step: The vehicle distance-keeping module 29 of the host vehicle 10 generates a command to control the accelerator or the brake based on the speed and the acceleration of the front vehicle 40 and the distance of the host vehicle 10 to the front vehicle 40 and transmits the command to the controller to keep a distance between the host vehicle 10 and the front vehicle 40. In particular, the vehicle distance-keeping module 29 will keep a fixed distance to the front vehicle 40 in a straight-line lane, a curved lane, or an area where lane line detection fails.

Figure 8:
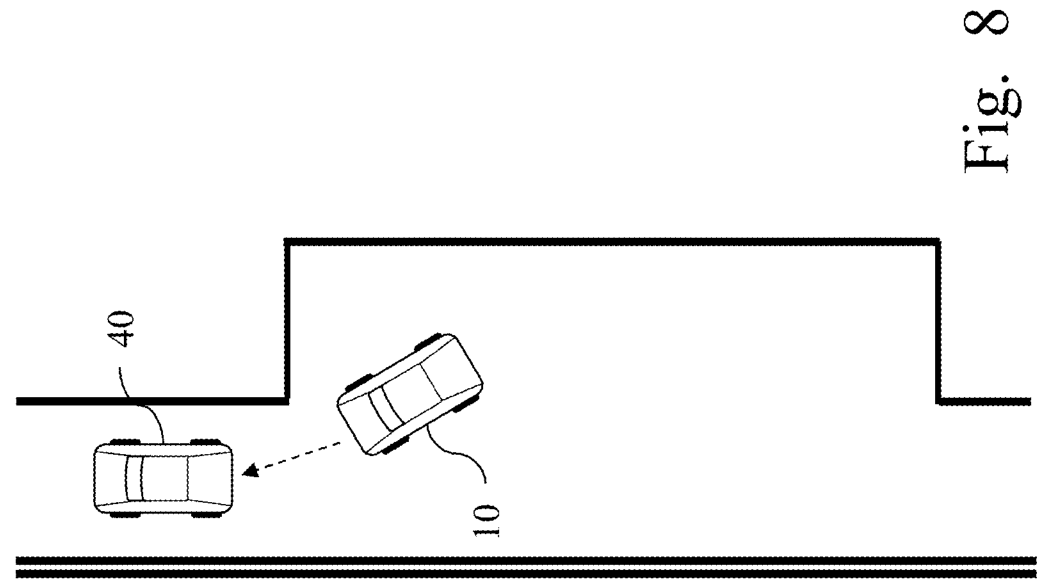
FIGS. 7-8 are schematic diagrams illustrating a host vehicle that follows a front-vehicle path in a pull-off area.
Figure 7:
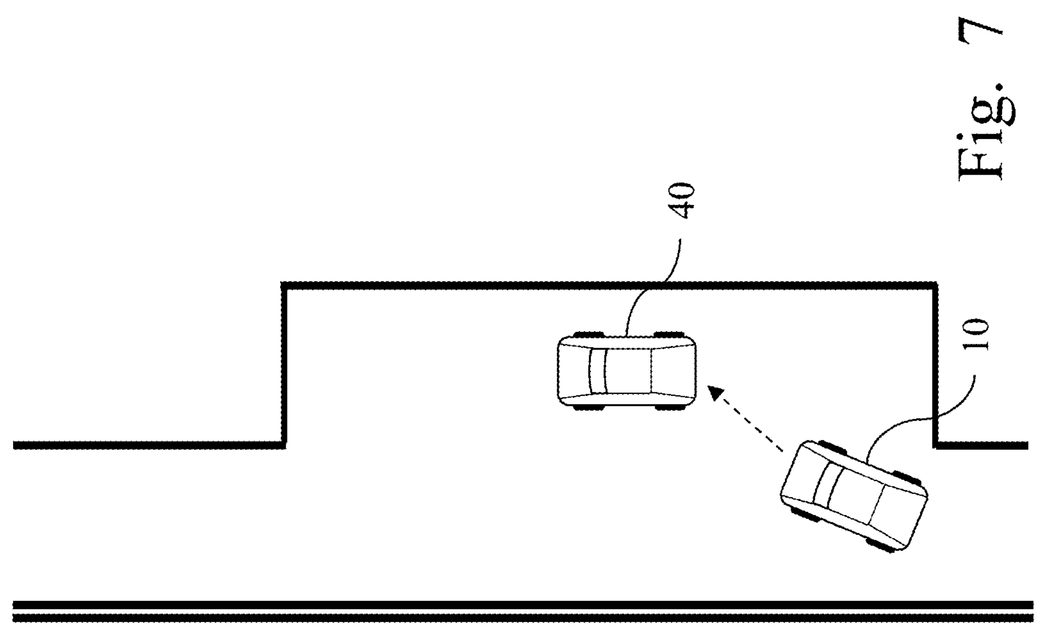

The present invention can be applied to road sections without lane lines, such as pull-off areas, intersections, etc. Taking the pull-off area as an example, please refer to FIGS. 7 and 8. The host vehicle 10 activates the lane following system (LFS) in the straight road section, detects the lane line and moves forward in a straight line, and keeps a safe distance to the front vehicle 40. When the positioning system of the host vehicle 10 [such as the global positioning system (GPS)] finds that the current location is close to the area where lane line detection fails, the on-board system will firstly determine whether the front vehicle 40 is located within a detection range. If there is no front vehicle 40 or the front vehicle 40 is not located within the radar detection range of the host vehicle 10, the on-board system on the host vehicle 10 will decide to continue running the lane following system or switch to a manual driving mode based on whether the lane line is detected. If a lane line is detected, the lane following system will be run. If a lane line is not detected, the on-board system will switch to the manual driving mode. If the front vehicle 40 is located within the detection range and the front-vehicle information transmitted by the front vehicle 40 is received based on vehicle-to-vehicle wireless communication technology, the host vehicle 10 will switch the automatic driving system to the front-vehicle following system and the front-vehicle path-following system 20 of the present invention, thereby automatically following the path of the front vehicle 40. In FIG. 7, the front vehicle 40 enters a pull-off area and the host vehicle 10 employs the front-vehicle path-following system 20 to follow the front-vehicle wheel speed path or the front-vehicle estimation path of the front vehicle 40, and follows the front vehicle 40 to enter the pull-off area. In FIG. 8, the front vehicle 40 leaves the pull-off area and the host vehicle 10 employs the front-vehicle path-following system 20 to follow the front-vehicle wheel speed path or the front-vehicle estimation path of the front vehicle 40, and follows the front vehicle 40 to leave the pull-off area. When the host vehicle 10 leaving the area where lane line detection fails, the host vehicle 10 ends the front-vehicle path-following system 20 and switches back to the lane following system or the manual driving mode. In the present invention, the area where lane line detection fails can be predefined on the satellite map.

In conclusion, the front-vehicle path-following system and the method thereof of the present invention obtain the front-vehicle information based on vehicle-to-vehicle wireless communication technology, generate a front-vehicle wheel speed path based on the information detected by the front-vehicle wheel speed sensor in the front-vehicle information, and then generate a front-vehicle estimation path based on the host-vehicle information obtained by the host vehicle detecting the front vehicle. The host vehicle can diagnose which one of the front-vehicle paths is more suitable for the host vehicle to follow. In this way, the host vehicle can still follow the path of the front vehicle to steer in areas where lane line detection fails without spending high equipment costs, thereby solving the conventional problem with being unable to drive automatically in areas where lane line detection fails.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A front-vehicle path-following system, applied to a host vehicle, comprising:

a transceiver interface coupled to sensing devices on the host vehicle and configured to receive multiple types of host-vehicle information detected by the sensing devices and multiple types of front-vehicle information received by the sensing devices, wherein the multiple types of front-vehicle information are transmitted by a front vehicle; and at least one processor coupled to a controller of the host vehicle and the transceiver interface and configured to:

perform a front-vehicle path-estimating step to generate a front-vehicle estimation path based on the multiple types of host-vehicle information;

perform a path-matching step to generate a front-vehicle wheel speed path based on the multiple types of front-vehicle information and determine whether a current coordinate system of the host vehicle overlaps an adjacent coordinate system on the front-vehicle estimation path, wherein when the current coordinate system overlaps the adjacent coordinate system, a location of the host vehicle currently located on the front-vehicle wheel speed path is matched as a path following start point and a following path decision is made based on the path following start point and states of the front-vehicle wheel speed path and the front-vehicle estimation path; and perform a path switching step to control the controller to switch a following path of the host vehicle based on the following path decision, such that the host vehicle follows the front-vehicle wheel speed path or the front-vehicle estimation path.

2. The front-vehicle path-following system according to claim 1, wherein the front-vehicle path-estimating step comprises:

using historical locations of the front vehicle in the multiple types of front-vehicle information as path points and performing coordinate transformation on the path points to transform a past coordinate system of the host vehicle into the current coordinate system of the host vehicle; and fitting the path points into a path as the front-vehicle estimation path.

3. The front-vehicle path-following system according to claim 2, wherein the path-matching step is performed to calculate a path fitting equation based on coordinates of the path points and determine whether location errors and direction errors exist between the current coordinate system of the host vehicle and the adjacent coordinate system on the front-vehicle estimation path to determine whether the current coordinate system of the host vehicle overlaps the adjacent coordinate system.

4. The front-vehicle path-following system according to claim 1, wherein the path-matching step, matching a location of the host vehicle currently located on the front-vehicle wheel speed path as the path following start point and making the following path decision based on states of the front-vehicle wheel speed path and the front-vehicle estimation path comprises:

comparing a detected relative location of the front vehicle to the host vehicle to a detected current location of the front vehicle to determine a location of the host vehicle currently located on the front-vehicle wheel speed path as the path following start point, wherein the current location is included in the multiple types of host-vehicle information; and generating path following points based on the relative location and direction variations of the host vehicle and the front vehicle and fitting the path following points generated after determining the path following start point to make the following path decision.

5. The front-vehicle path-following system according to claim 1, wherein the path-matching step is performed to preset the front-vehicle wheel speed path and the front-vehicle estimation path to be identical.

6. The front-vehicle path-following system according to claim 1, wherein the path-matching step comprises:

diagnosing states of path points on the front-vehicle wheel speed path to determine whether the front-vehicle wheel speed path meets following conditions:

if yes, making a following front-vehicle wheel speed path decision; and if no, diagnosing states of path points on the front-vehicle estimation path to determine whether the front-vehicle estimation path meets the following conditions:

if yes, making a following front-vehicle estimation path decision, wherein the path points on the front-vehicle wheel speed path and the front-vehicle estimation path are generated after determining the path following start point; and if no, ending.

7. The front-vehicle path-following system according to claim 5, wherein the path-matching step comprises:

diagnosing states of path points on the front-vehicle wheel speed path to determine whether the front-vehicle wheel speed path meets following conditions:

if yes, making a following front-vehicle wheel speed path decision; and if no, diagnosing states of path points on the front-vehicle estimation path to determine whether the front-vehicle estimation path meets the following conditions:

if yes, making a following front-vehicle estimation path decision, wherein the path points on the front-vehicle wheel speed path and the front-vehicle estimation path are generated after determining the path following start point; and if no, ending.

8. The front-vehicle path-following system according to claim 6, wherein the following conditions include determining whether distribution of the path points is even and dense and determining whether a preview point generated based on a pure pursuit algorithm is located on the front-vehicle wheel speed path or the front-vehicle estimation path.

9. The front-vehicle path-following system according to claim 2, wherein the sensing devices comprise:

at least one radar configured to detect a relative speed and a relative distance of the front vehicle to the host vehicle;

a vehicle-to-vehicle wireless communication module configured to obtain a speed, an acceleration, a location, and a heading angle of the front vehicle transmitted by the front vehicle, and the at least one processor is configured to generate the front-vehicle wheel speed path and a coordinate system of the front vehicle based on the location and the heading angle of the front vehicle;

a host-vehicle wheel speed sensor configured to detect a location and a heading angle of the host vehicle and provide them for the at least one processor to generate the current coordinate system and the past coordinate system of the host vehicle; and an image-capturing device configured to capture front road images and provide them for the at least one processor, and the at least one processor is configured to capture an image of the front vehicle from the front road images and calculate a relative location of the front vehicle to the host vehicle based on the image of the front vehicle.

10. The front-vehicle path-following system according to claim 9, wherein the multiple types of front-vehicle information include a speed, an acceleration, a location, and a heading angle of the front vehicle, and the location and the heading angle of the front vehicle are measured by a front-vehicle wheel speed sensor of the front vehicle.

11. A front-vehicle path-following method applied to a front-vehicle path-following system of a host vehicle, the host vehicle receiving multiple types of host-vehicle information detected by sensing devices and multiple types of front-vehicle information received by the sensing devices to perform the front-vehicle path-following method, and the front-vehicle path-following method comprising:

performing a front-vehicle path-estimating step to generate a front-vehicle estimation path based on the multiple types of host-vehicle information;

performing a path-matching step to generate a front-vehicle wheel speed path based on the multiple types of front-vehicle information and determine whether a current coordinate system of the host vehicle overlaps an adjacent coordinate system on the front-vehicle estimation path, wherein when the current coordinate system overlaps the adjacent coordinate system, a location of the host vehicle currently located on the front-vehicle wheel speed path is matched as a path following start point and a following path decision is made based on the path following start point and states of the front-vehicle wheel speed path and the front-vehicle estimation path, and the multiple types of front-vehicle information are transmitted from a front vehicle to the host vehicle; and performing a path switching step to control a controller to switch a following path of the host vehicle based on the following path decision, such that the host vehicle follows the front-vehicle wheel speed path or the front-vehicle estimation path.

12. The front-vehicle path-following method according to claim 11, wherein front-vehicle path-estimating step comprises:

using historical locations of the front vehicle in the multiple types of front-vehicle information as path points and performing coordinate transformation on the path points to transform a past coordinate system of the host vehicle into the current coordinate system of the host vehicle; and fitting the path points into a path as the front-vehicle estimation path.

13. The front-vehicle path-following method according to claim 11, wherein in the path-matching step, a path fitting equation is calculated based on coordinates of the path points and it is determined whether location errors and direction errors exist between the current coordinate system of the host vehicle and an adjacent coordinate system on the front-vehicle estimation path to determine whether the current coordinate system of the host vehicle overlaps the adjacent coordinate system.

14. The front-vehicle path-following method according to claim 11, wherein the step of matching a location of the host vehicle currently located on the front-vehicle wheel speed path as the path following start point and making the following path decision based on states of the front-vehicle wheel speed path and the front-vehicle estimation path comprises:

comparing a detected relative location of the front vehicle to the host vehicle to a detected current location of the front vehicle to determine a location of the host vehicle currently located on the front-vehicle wheel speed path as the path following start point, wherein the current location is included in the multiple types of host-vehicle information; and generating path following points based on the relative location and direction variations of the host vehicle and the front vehicle and fitting the path following points generated after determining the path following start point to make the following path decision.

15. The front-vehicle path-following method according to claim 11, wherein in the path-matching step, the front-vehicle wheel speed path and the front-vehicle estimation path are preset to be identical.

16. The front-vehicle path-following method according to claim 11, wherein the path-matching step comprises:

diagnosing states of path points on the front-vehicle wheel speed path to determine whether the front-vehicle wheel speed path meets following conditions:

if yes, making a following front-vehicle wheel speed path decision; and if no, diagnosing states of path points on the front-vehicle estimation path to determine whether the front-vehicle estimation path meets the following conditions:

if yes, making a following front-vehicle estimation path decision, wherein the path points on the front-vehicle wheel speed path and the front-vehicle estimation path are generated after determining the path following start point; and if no, ending.

17. The front-vehicle path-following method according to claim 15, wherein the path-matching step comprises:

diagnosing states of path points on the front-vehicle wheel speed path to determine whether the front-vehicle wheel speed path meets following conditions:

if yes, making a following front-vehicle wheel speed path decision; and if no, diagnosing states of path points on the front-vehicle estimation path to determine whether the front-vehicle estimation path meets the following conditions:

if yes, making a following front-vehicle estimation path decision, wherein the path points on the front-vehicle wheel speed path and the front-vehicle estimation path are generated after determining the path following start point; and if no, ending.

18. The front-vehicle path-following method according to claim 16, wherein the following conditions include determining whether distribution of the path points is even and dense and determining whether a preview point generated based on a pure pursuit algorithm is located on the front-vehicle wheel speed path or the front-vehicle estimation path.

19. The front-vehicle path-following method according to claim 12, wherein the sensing devices comprise:

at least one radar configured to detect a relative speed and a relative distance of the front vehicle to the host vehicle;

a vehicle-to-vehicle wireless communication module configured to obtain a speed, an acceleration, a location, and a heading angle of the front vehicle transmitted by the front vehicle, and the at least one processor is configured to generate the front-vehicle wheel speed path and a coordinate system of the front vehicle based on the location and the heading angle of the front vehicle;

a host-vehicle wheel speed sensor configured to detect a location and a heading angle of the host vehicle and provide them for the at least one processor to generate the current coordinate system and the past coordinate system of the host vehicle; and an image-capturing device configured to capture front road images and provide them for the at least one processor, and the at least one processor is configured to capture an image of the front vehicle from the front road images and calculate a relative location of the front vehicle to the host vehicle based on the image of the front vehicle.

20. The front-vehicle path-following method according to claim 18, wherein the multiple types of front-vehicle information include a speed, an acceleration, a location, and a heading angle of the front vehicle, and the location and the heading angle of the front vehicle are measured by a front-vehicle wheel speed sensor of the front vehicle.

* * * * *